June 5, 1934.  T. B. POWERS  1,961,247
SMOKING PIPE
Filed Aug. 11, 1933
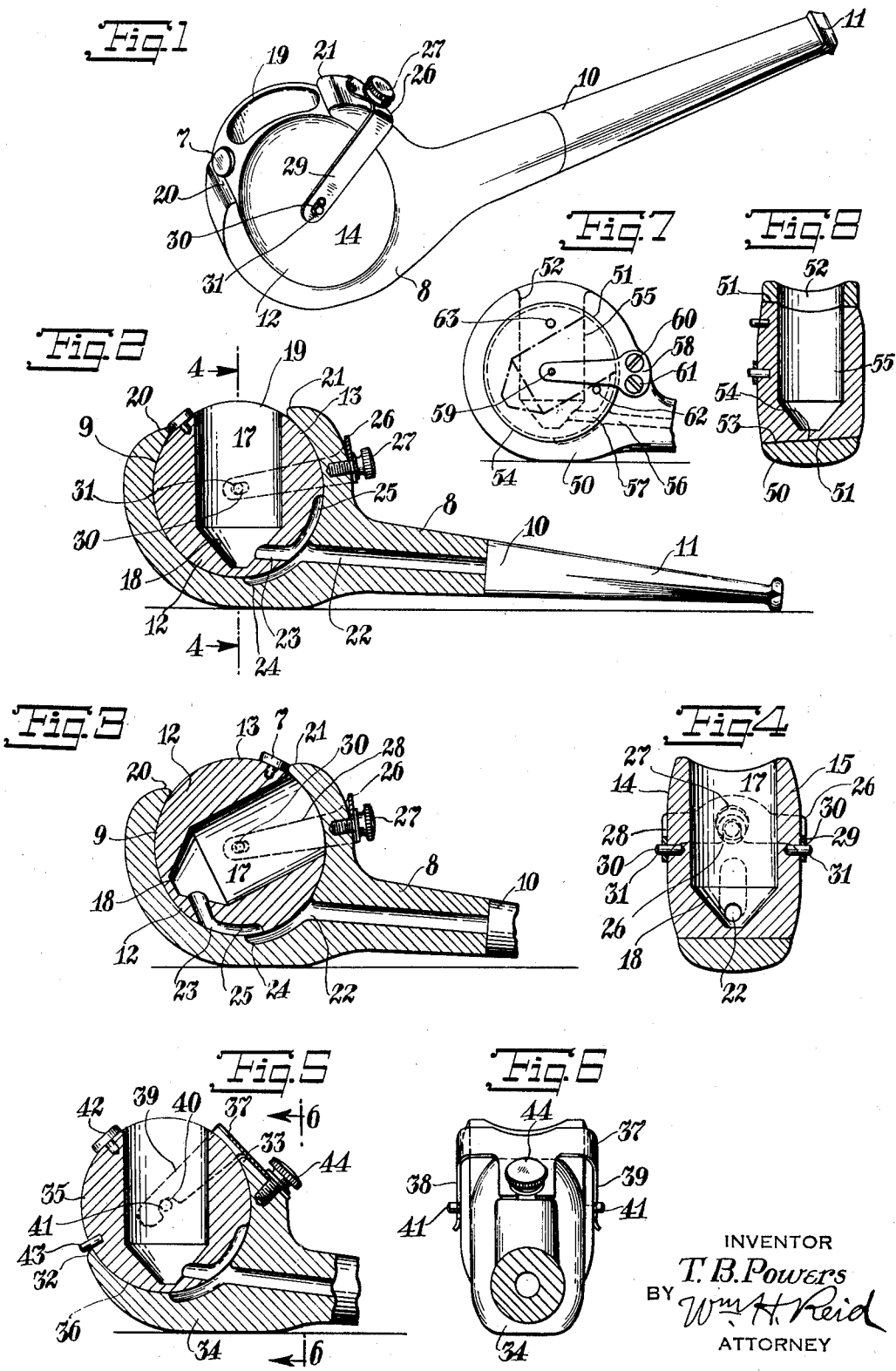
INVENTOR
*T. B. Powers*
BY *Wm H. Reid*
ATTORNEY Patented June 5, 1934

1,961,247

UNITED STATES PATENT OFFICE 1,961,247

SMOKING PIPE

Timothy B. Powers, St. George, Staten Island, N. Y.

Application August 11, 1933, Serial No. 684,615

9 Claims. (Cl. 131—12)

This invention relates to smoking pipes, and has for its object to provide a kind of pipe in which the bowl member is separate from a body member, which latter includes the usual stem and mouth piece, and which bowl member can be swung from its usual position for normal use, to a position in which the bowl top opening will be covered by a wall of the body member; so that the pipe can then be placed in the pocket of the user, or in a drawer or any other place, and the tobacco in the bowl, if still burning, will be at once extinguished, and the contents of the bowl, both tobacco and ashes, will be retained in the bowl, and cannot escape from the bowl into the pocket or any location where the pipe is placed. And the arrangement will also function to permit the bowl to be shifted or swung to a position in which the top opening of the bowl will be only partly covered or closed by the casing and the pipe can still be smoked by the user, by having only a small edge portion of the bowl exposed to draw in the air and emit the smoke.

Another object of the invention is to provide an arrangement of shiftable bowl that can be caused to be covered by the casing, in which the bowl is readily detachable when desired for cleaning or for replacing by another bowl.

In the accompanying drawing showing embodiments of my invention;—

Figure 1 is a perspective view of one form, in the open position.

Fig. 2 is a longitudinal section of the same form of pipe,

Fig. 3 is a sectional view like Fig. 2, showing the bowl in closed position.

Fig. 4 is a cross section on line 4—4 of Fig. 2.

Fig. 5 shows in section another form of pipe.

Fig. 6 is an end view of the latter.

Figs. 7 and 8 show a modification.

As shown in Figs. 1–4, a body 8 is formed with an opening or channel 9 with an inner curved or cylindrical wall or bore, which casing has the usual hollow stem 10 and mouth piece 11. In the body channel or opening 9 turns a bowl member 12 of somewhat cylindrical shape, with a periphery 13, and ends 14, 15. This bowl member is of a size to turn or swing in the opening 9 of the body; and is provided with a bowl cavity or socket 17 extending down from the periphery nearly to the opposite side of the member, with a bottom wall 18, see Fig. 2.

Means are provided for retaining the bowl member to swing in the body opening from a position in which the opening in the bowl cavity is located at the top opening 19 of the body, between the edges 20 and 21 of the body inner wall, to a position in which the bowl cavity 17 is covered or closed by the peripheral wall 9 of the body, as shown in Fig. 3. As a means of communication between the bottom of the bowl and the stem bore, the body 8 has a bore forming a port 22 in the inner curved wall 16 of the body. The bowl member 12 has a bore leading into the cavity and forming a port 23 in the curved wall 13 of the member. These ports will register in the normal upright position of the bowl, as shown in Fig. 2, so that the pipe will smoke in the usual manner. In the drawing the port 23 is shown extended by a groove 24 in the outer wall of the bowl member, and the port 22 in the body is extended by a groove 25. By this means the bowl can be swung and be partly covered by the wall of the body at 21, and the pipe will still draw because the body port is still in communication with the bowl port.

Means are provided for holding the bowl member 13 in the opening or inner curved wall of the body at 9; as shown, I provide a kind of trunnion member that is secured to the body member, and is pivoted in the axis of the the bowl member. This may comprise a slotted plate or strip 26, detachably secured by a screw 27 to the body. Resilient arms 28 and 29 project from the plate 26, with a slot 30 in each arm, that engage pins 31, at each end of the bowl, in the axis thereof, see Fig. 3. By loosening the screw 27, the plate and arms can be swung up beyond the wall 21 of the body and then the bowl can be moved endwise out of the channel 9 in the body.

In the form shown in Figs. 5 and 6, the edges 32 and 33 of the casing 34, will expose at least one half of the periphery of the bowl member 35, so that this member can be inserted and removed from the casing channel 36 in a direction radial of the bowl member. The body and bowl member are here the same otherwise as shown in Figs. 1–4. But the trunnion frame or plate 37 that is slotted, has arms 38 and 39, formed with side slots 40 that engage pins 41 in the bowl ends, so that by merely swinging the arms outwards away from the pins, the bowl can be removed and replaced.

In the modification shown in Figs. 7 and 8, the casing 50 has an opening with a continuous conical bore 51, and an opening 52 into the bore at the top of the casing or body. A bowl member 53 of conical shape turns by its conical or tapered periphery 54 in the bore 51, to shift the bowl cavity 55 from a position in which it registers with the top hole 52 of the casing, to a position in which the bowl is covered by the bore wall 51 of the body, as indicated in Fig. 7. An arm 58 is held by screws 59, 60, on the body, and presses the bowl into the conical bore; and swinging the arm will permit removal of the bowl. Stop pins 62, 63, limit the swing of the bowl to the open and closed positions.

What I claim is;—

1. In a smoking pipe an open body connected with a hollow stem, and a mouth piece, the body being provided with an inner cylindrical wall that has an opening at the top of the body and also provided with a port leading from the stem into said body inner wall, a separate bowl member of substantially cylindrical shape with a bowl cavity extending in from the periphery and which member has a port leading from the bottom of the bowl into the outer peripheral wall thereof, the bowl being mounted to turn in said body member inner wall from a position in which the bowl opening is exposed at the said top opening of the body and the bowl port is in register with the said body port leading to the stem, to a position in which the top bowl opening is covered by the said inner curved wall of the body, and means for removably retaining the bowl to turn in the body.

2. In a smoking pipe, an open body connected with a hollow stem and a mouth piece, the body being provided with an inner cylindrical wall that has an opening at the top of the body and also provided with a port leading from the stem into said body inner wall, a separate bowl member of substantially cylindrical shape with a bowl cavity extending in from the periphery and which member has a port leading from the bottom of the bowl into the outer peripheral wall thereof, the bowl being mounted to turn in said body member inner wall from a position in which the bowl opening is exposed at the said top opening of the body and the bowl port is in register with the said body port leading to the stem, to a position in which the top bowl opening is covered by the said inner curved wall of the body, and a trunnion member carried by the body and pivoted to the bowl on each side thereof in the axis of the bowl member.

3. In a smoking pipe, an open body member connected with a hollow stem and a mouth piece, the body being provided with an inner cylindrical wall that has an opening at the top of the body and also provided with a port leading from the stem into said body inner wall, a separate bowl member of substantially cylindrical shape with a bowl cavity extending in from the periphery and which member has a port leading from the bottom of the bowl into the outer peripheral wall thereof, the bowl being mounted to turn in said body member inner wall from a position in which the bowl opening is exposed at the said top opening of the body and the bowl port is in register with the said body port leading to the stem, to a position in which the top bowl opening is covered by the said inner curved wall of the body, and a trunnion member formed of a plate secured to the body and having a pair of spring arms each slotted at the end, the bowl having a pin on each side in the axis to engage said slotted arm.

4. In a smoking pipe, an open body member connected with a hollow stem and a mouth piece, the body being provided with an inner cylindrical wall that has an opening at the top of the body and also provided with a port leading from the stem into said inner body wall, a separate bowl member of substantially cylindrical shape with a bowl cavity extending in from the periphery and which member has a port leading from the bottom of the bowl into the outer peripheral wall thereof, the bowl being mounted to turn in said body member inner wall from a position in which the bowl opening is exposed at the said top opening of the body and the bowl port is in register with the said body port leading to the stem, to a position in which the top bowl opening is covered by the said inner curved wall of the body, and a trunnion member formed of a plate secured to the body and having a pair of spring arms each slotted at the end, the bowl having a pin on each side in the axis to engage said slotted arm, said arms being arranged to press the bowl member down into the said inner body wall.

5. In a smoking pipe, an open body connected with a hollow stem and a mouth piece, the body being provided with an inner cylindrical wall that has an opening at the top of the body and also provided with a port leading from the stem into said inner body wall, a separate bowl member of substantially cylindrical shape with a bowl cavity extending in from the periphery and which member has a port leading from the bottom of the bowl into the outer peripheral wall thereof, the bowl being mounted to turn in said body inner wall from a position in which the bowl opening is exposed at the said top opening of the body and the bowl port is in register with the said body port leading to the stem, to a position in which the top bowl opening is covered by the said inner curved wall of the body, and means for removably retaining the bowl to turn in the body, one of said registering ports being extended whereby the bowl can be swung to a position partly closed by the body wall while the ports remain open and in register.

6. In a smoking pipe, an open body connected with a hollow stem and a mouth piece, the body being provided with an inner cylindrical wall that has an opening at the top of the body and also provided with a port leading from the stem into said inner body wall, a separate bowl member of substantially cylindrical shape with a bowl cavity extending in from the periphery and which member has a port leading from the bottom of the bowl into the outer peripheral wall thereof, the bowl being mounted to turn in said body inner wall from a position in which the bowl opening is exposed at the top opening of the body and the bowl port is in register with the said body port leading to the stem, to a position in which the top bowl opening is covered by the said inner curved wall of the body, and means for removably retaining the bowl to turn in the body, said body top opening being larger than the bowl diameter for removal of the bowl upwardly through the said top opening of the body.

7. In a smoking pipe, an open body connected with a hollow stem and a mouth piece, the body being provided with an inner substantially curved wall that has an opening at the top of the body, with a port leading from the stem into the inner body wall, a separate bowl member of substantially cylindrical shape with a bowl cavity extending in from the periphery and which member has a port leading from the bottom of the bowl into the outer peripheral wall thereof, the bowl being mounted to turn in said body inner wall from a position in which the bowl opening is exposed at said top opening of the body and the bowl port is in register with the said body port leading to the stem, to a position in which the top bowl opening is covered by the said inner curved wall of the body, and means for removably retaining the bowl in the body, said registering ports in the bowl and in the body bore each being extended whereby the bowl can be swung to a position partly closed by the body wall while the ports remain open and in register.

8. In a smoking pipe, an open body connected with a hollow stem and with a mouth piece, the body being provided with a substantially conical inner wall that has an opening at the top of the body and also provided with a port leading from the stem into the said body inner wall, a separate bowl member of substantially conical shape with a bowl cavity extending in from the periphery and which member has a port leading from the bottom of the bowl into the outer peripheral wall thereof, the bowl being mounted to turn in said body member inner wall from a position in which the bowl opening is exposed at the said top opening of the body and the bowl port is in register with said body port leading to the stem, to a position in which the top bowl opening is covered by the said inner curved wall of the body, and means for removably retaining the bowl to turn in the body.

9. In a smoking pipe, an open body connected with a hollow stem and with a mouth piece, the body being provided with an inner curved bore that has an opening leading into the bore at the top of the body and also provided with a port leading from the stem into said bore wall, a separate bowl member of curved shape with a bowl cavity extending in from the periphery and which member has a port leading from the bottom of the bowl into the outer peripheral wall thereof, the bowl being mounted to turn in said body member bore from a position in which the bowl opening is exposed at the said bore top opening of the body and the bowl port is in register with said body port leading to the stem, to a position in which the top bowl opening is covered by the said bore wall of the body, and means for removably retaining the bowl to turn in the body.

TIMOTHY B. POWERS.